United States Patent
Dominguez

[19]

[11] Patent Number: 5,946,635
[45] Date of Patent: Aug. 31, 1999

[54] SPORTING EVENT CONFIGURABLE RADIO RECEIVER/SCANNER

[76] Inventor: David C. Dominguez, 18928 Canyon Hill Dr., Trabuco Canyon, Calif. 92679

[21] Appl. No.: 08/909,486

[22] Filed: Aug. 12, 1997

[51] Int. Cl.[6] .................................................... H04B 1/38
[52] U.S. Cl. ........................... 455/558; 455/90; 455/575; 379/357
[58] Field of Search ............................. 455/90, 575, 556, 455/557, 558, 66, 348, 349, 351, 566; 379/357, 368, 369

[56] References Cited

U.S. PATENT DOCUMENTS

| | | | |
|---|---|---|---|
| 4,236,251 | 11/1980 | Ohgishi et al. | 455/180 |
| 4,496,148 | 1/1985 | Morstain et al. | 273/1 E |
| 4,888,815 | 12/1989 | Ahlemeyer et al. | 455/168 |
| 4,984,295 | 1/1991 | Engstrom et al. | 455/186 |
| 5,001,775 | 3/1991 | Hayashi et al. | 455/158 |
| 5,163,161 | 11/1992 | Bowles et al. | 455/164.1 |
| 5,257,414 | 10/1993 | Trahan et al. | 455/90 |
| 5,307,513 | 4/1994 | Harada | 455/186.1 |
| 5,355,527 | 10/1994 | Owaki | 455/186.2 |
| 5,371,493 | 12/1994 | Sharpe et al. | 379/357 |
| 5,448,765 | 9/1995 | Kovanen et al. | 455/558 |
| 5,465,401 | 11/1995 | Thompson | 455/90 |
| 5,471,661 | 11/1995 | Atkinson | 455/165.1 |
| 5,537,674 | 7/1996 | Kishimoto et al. | 455/186.1 |
| 5,572,573 | 11/1996 | Sylvan et al. | 455/558 |
| 5,594,778 | 1/1997 | Schaupp, Jr. et al. | 379/368 |
| 5,857,157 | 6/1996 | Shindo | 455/90 |

*Primary Examiner*—Dwayne D. Bost
*Assistant Examiner*—Quochien B. Vuong
*Attorney, Agent, or Firm*—Stetina Brunda Garred & Brucker

[57] ABSTRACT

The present invention relates to a configurable hand held radio monitor for use in monitoring sporting events. In particular, the radio monitor is specifically adapted for automobile racing sporting events and includes an onboard microprocessor for controlling a radio receiver. A removable memory card is provided which includes a series of predetermined radio frequencies which are used by the microprocessor when the memory card is inserted into the radio monitor housing. A removable and replaceable keypad overlay is additionally provided to correspond to the information recorded on the memory card. With the keypad overlay and the memory module, the radio monitor is adapted to operate at a specific racing event or a specific racing division.

7 Claims, 10 Drawing Sheets

SPORTING EVENT CONFIGURABLE RADIO RECEIVER/SCANNER

RELATED DISCLOSURE

The present invention has been previously identified by the Applicant in Disclosure Document No. 409634 filed with the United States Patent and Trademark Office on Dec. 12, 1996, the contents of which is hereby incorporated by reference.

FIELD OF THE INVENTION

The present invention relates generally to a sporting event configurable radio/scanner to be used by automobile racing enthusiasts to monitor radio communications associated with a racing event. The present invention comprises a radio receiver which includes a removable modular memory card and onboard memory both of which include predetermined radio frequencies which allows the user to monitor the radio frequencies assigned to drivers, crews, officials and broadcasts.

BACKGROUND OF THE INVENTION

Automobile racing as a sport is increasing in popularity. With the increased interest in automobile racing, sponsors, networks and other like media have capitalized upon the sport through televising the events and/or broadcasting the race on AM and FM radio stations.

Typically, racing events are held in a looped track format where race car driver teams are stationed along the track, typically in the pit-stop area. In virtually all instances associated with professional racing, the pit-crews are in communication with the race car driver. The pit-crews may additionally be in radio communication with other crew members. In this regard, there is a substantial amount of radio activity occurring at the race track which could be monitored and utilized in some usable format. Although it may be possible for a spectator to use a conventional type scanner to lock-in on the pit-crew radio frequencies, the same would be time consuming to program in the frequencies assigned to the racing teams and divert the attention of the spectator away from the racing event itself. In order to perform the programming operation, the user of the scanning radio has to remember the frequencies assigned to the racing teams. Although the assigned frequencies of the racing teams may be learned from published listings, it is very cumbersome for the user to program the frequencies of all of the desired racing teams. With a conventional radio scanner the user is limited to assigning one frequency to a channel number. Typically, a user will program a racing team frequency and assign it to a channel number that matches the car number. There exists a problem in that most racing teams have more than one frequency assigned to them, resulting in the user having to assign the additional frequencies to channel numbers that do not match the car number which is confusing. Further, during a typical racing event weekend there will be more than one racing division of cars in participation, thus resulting in the user having to reprogram the conventional scanner channel frequencies for each racing division which takes a great deal of time. Thus, it is not practical to use a conventional scanner for a spectator to monitor the plurality of pit-crews and the radio frequencies used by such pit-crews. Accordingly, there is a need for a device which a spectator at a racing event could monitor a plurality of pit-crews with a minimal amount of programming. It would be additionally advantageous to have a device that would also monitor T.V. and radio broadcasts, track data information being broadcast, as well as race official broadcast. It would be additionally advantageous to utilize a device which may be configured for each racing event without having to reprogram the radio with racing team frequencies.

SUMMARY OF THE INVENTION

Accordingly, it is an objective of the present invention to provide an improved scanning radio receiver which overcomes the above described problems associated with the prior art.

The present invention relates to a hand held radio receiver for use with removable and replaceable memory cards and associated key pad overlays. The memory cards store digital codes used to program the radio receiver for receiving signals on predetermined frequencies assigned to automobile racing teams. Paired with the memory card is a keypad overlay that identifies the functions available along with 15 channel keys. The removable and replaceable memory card and keypad overlay allows the user to configure the radio receiver for listening to race teams of different racing divisions. The channel keys are identified with the car numbers belonging to popular drivers of the automobile racing division for which the memory card and the keypad overlay are identified for. In this manner, the user can listen to one of the drivers by pressing the channel key with a number that matches the car number of the desired driver. If a particular driver has more than one predetermined frequency assigned to the team, the receiver will scan all of the frequencies assigned to that team when the associated car number channel is pressed. Scanning will continue until a radio transmission is detected or another channel key or function key is pressed. Other keys may include keys which can be assigned at frequencies determined by the user, T.V. and radio keys for monitoring T.V. and radio broadcasts at the race track, a key for monitoring track control radio transmissions and a key for monitoring particular radio signals of officials of the race track. The keypad additionally features numerous function keys which allow the programming of the monitor in various scanner modes. Modes may include random scanning or less specific tuning or selection.

It is contemplated by the present invention that either prior to attending a racing event or at the racing event, a user could purchase a memory card and key pad overlay to insert in the radio monitor. This would allow the user to become involved as a true racing enthusiasts by being able to monitor many if not all of the pit-crews engaged in the racing event. At the very least, the user could monitor the more popular race car drivers. Following the event, the keypad overlay could be discarded or saved as a souvenir as decorative or informational indicia concerning the racing event including such as the event logo, location and date may be included on the keypad overlay. Typically, the popular drivers do not change radio frequencies during a racing season, thus the memory card and keypad overlay may be retained for future events of the same racing division. Users can purchase updated memory cards and keypad overlays as necessary.

The radio monitor would include a radio receiver having the RF amplifier, a mixer, a frequency synthesizer for generation of local oscillator signal, an IF amplifier, a demodulator, a signal detector and an output audio stage. A memory card incorporating a first memory means for storing digital codes for the frequencies allocated to automobile racing teams is removable and replaceable from the configurable radio receiver. A removable keypad overlay is provided which corresponds to the information stored on the first memory means. A second memory means is provided for storing operating instructions and data for use by a microprocessor/microcontroller. The microprocessor would control the operating function of the radio monitor. A third memory means is provided for storing digital codes for valid frequencies resulting from a manual entry of frequency data or a manual frequency search. The microprocessor loads and retrieves information and instruction from the first, second or third memory means. A keypad is in electrical communication with the microprocessor comprising a plurality of keys. A keypad overlay identifies channel keys and functions keys that are associated with the first memory means. The keypad overlay is removable and replaceable from the configurable radio monitor.

The channel keys of the keypad are for selecting predetermined frequencies assigned to an auto racing team for radio communication. The microprocessor is responsive to the channel keys and loads the frequency synthesizer with digital codes read from the first memory means or the third memory means when the channel key is selected. The channel keys are typically numerically identified and represent the race car numbers and are associated with communication channels. Further, ten of the channel keys are additionally numerically identified with numbers 0 to 9. These channel keys combined with the car number function key allows the user to enter any race car number and scan for the associated radio communication.

Function keys are provided for executing algorithms and operations performed by the microprocessor. The microprocessor is responsive to the function keys for the user's manual input of frequency information, manual frequency search and scanning operations. It is to be understood that a further keypad may contain additional or different function keys relating to any one of a plurality of other memory cards selected by the user so as to configure the radio monitor for a particular application. Further, T.V. and radio broadcast frequencies are all frequencies within the receding capabilities of the radio monitor. It is an additional object of the present invention to provide a display means for displaying a radio frequency and other visual information. These and other objects and advantages of the present invention will become more apparent upon reading the following detailed description of the preferred embodiment in conjunction with accompanying drawings.

DETAILED DESCRIPTION OF THE PREFERRED EMBODIMENTS

The detailed description as set forth below in connection with the appended drawings is intended as a description of the presently preferred embodiments of the invention, it is not intended to represent the only form in which the present invention may be construed or utilized. The description sets forth the functions and sequence of steps for constructing and operating the invention in connection with the illustrated embodiments. It is understood, however, that the same or equivalent functions and sequences may be accomplished by different embodiments and that they are also intended to be encompassed within the scope of this invention.

Figures 1, 2:
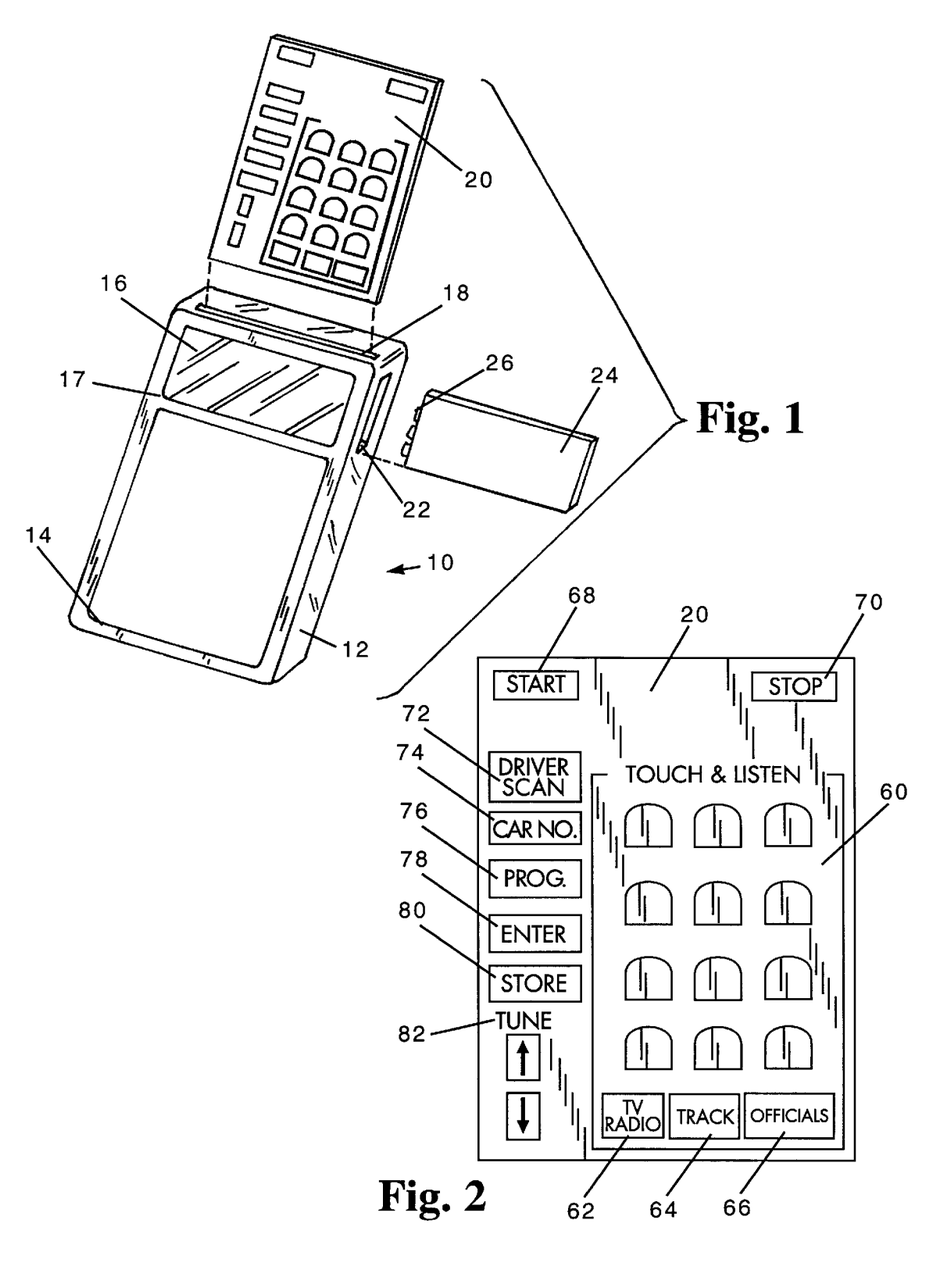
FIG. 1 is a perspective view of the radio monitor housing with modular components in relative position to the modular slots.
FIG. 2 is a top-plan view of a typical keypad overlay of the present invention.

Shown in FIG. 1 is a perspective view of the hand held radio monitor 10 of the present invention. The housing 12 of the radio monitor is formed from a rigid material such as plastic or metal. The housing 12 is adapted to enclose the electronics of the radio monitor 10. A keypad opening 14 is formed on the face of the housing 12. The opened area allows the users to access the keypad (not shown). A transparent window 16 is formed on the face of the upper portion of the housing 12 to allow the viewing of an electronic display means (not shown) which is located beneath the transparent window 16. The transparent window may be formed of plexiglass, plastic or other transparent material. The transparent window 16 is configured within an electronic display opening 17 formed within the upper face of the housing 12.

The housing 12 includes a keypad overlay slot which is adapted to frictionally receive a keypad overlay 20 so that the keypad overlay 20 covers the keypad (not shown) when it appears in the keypad opening 14. The keypad 20 has indicia formed on its face to correspond to a like positioned keypad key. The indicia is discussed in greater detail below with respect to FIG. 2. The housing 12 additionally includes a memory component slot 22 adapted to receive a memory card 24. The slot 22 is adapted to frictionally receive the memory card 24 which comes into electrical contact with the internal electronics of the radio monitor 10. The memory card 24 may include contact leads 26 which are adapted to come in contact with docking leads (not shown) located within the internal electronics of the radio monitor 10. As discussed in greater detail below, the memory card 24 includes a first memory means (not shown).

The keypad overlay may be formed with a sheet of plastic material or other rigid or semi-rigid material which is adapted to be received within the slot 18. It is preferable that the overlay 20 be formed of an inexpensive material as it is expected that the indicia formed thereon may become obsolete at the end of a particular racing event and therefore disposed of. However, the overlay may be retained as a record of the event. Moreover, the opposite side of the card has blank space intended to have written, therein by the user, the name of the winning driver of a particular racing event and any general notes or driver autographs. The information contained on the keypad overlay is intended to correspond to information stored on the first memory means (not shown) of the memory card 24. Accordingly, when a new memory card 24 is inserted into the housing 12, the information contained on the previous keypad overlay 20, may become obsolete. It is additionally contemplated by the present invention that the keypad (not shown) when a memory module is not inserted in the housing 12 may include a basic indicia formed therein so that the radio monitor can act as a typical scanner when not being used in association with a racing event.

Figure 3:
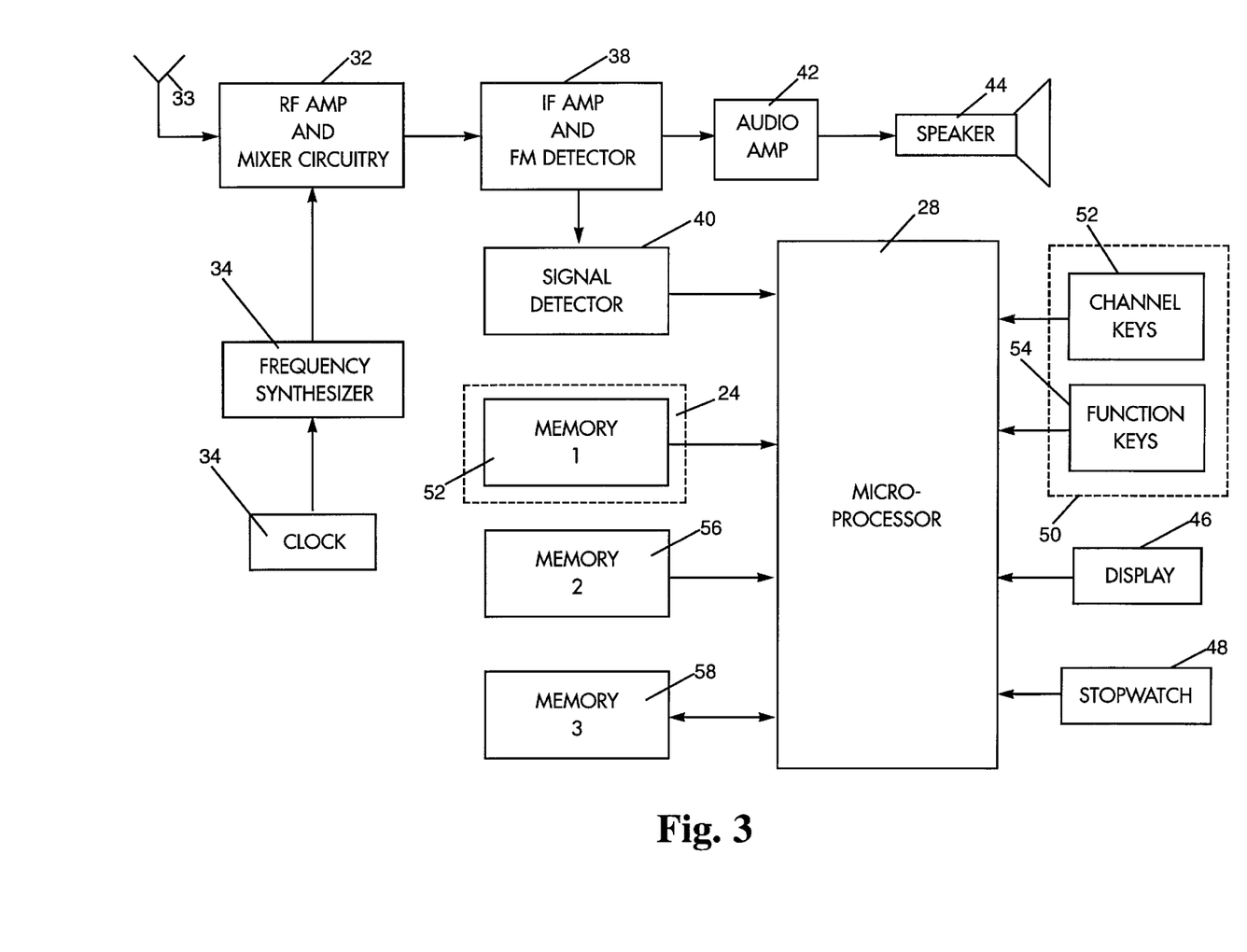
FIG. 3 is schematic block diagram of the electronic component of the radio monitor of the present invention.
Figure 4A:
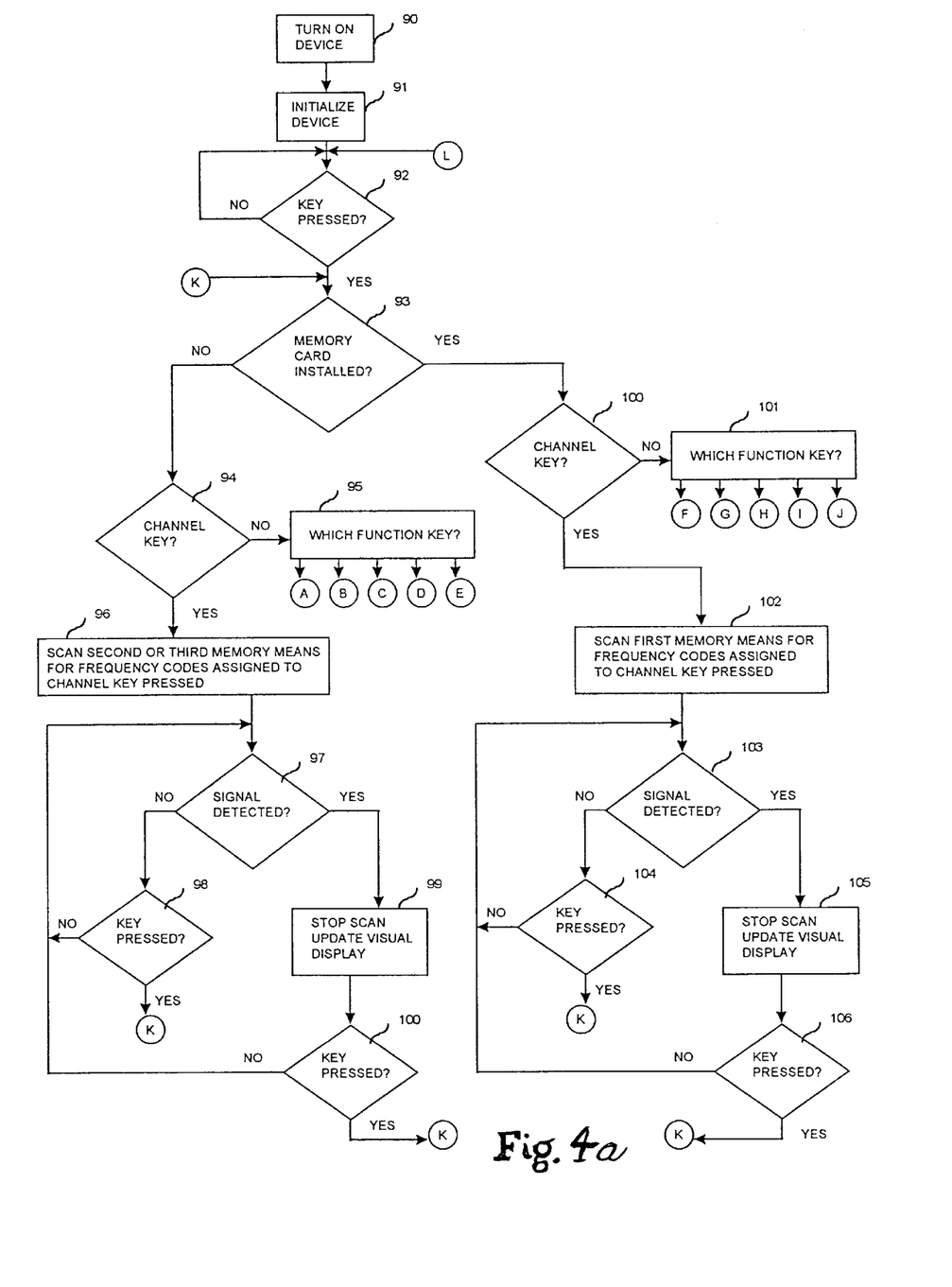
FIGS. 4a–4h show a flow chart of operations carried out by the microprocessor 28 of the device.
Figure 4B:
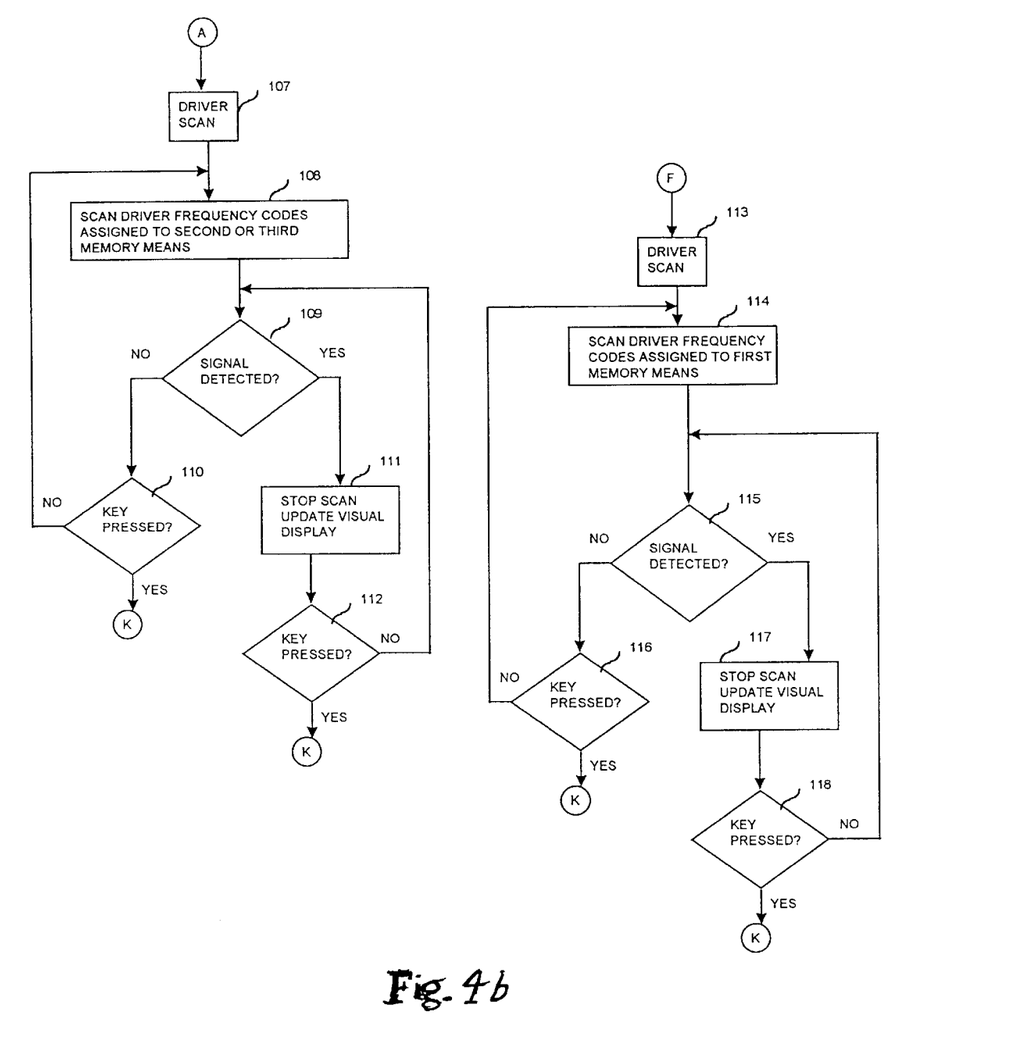
Figure 4C:
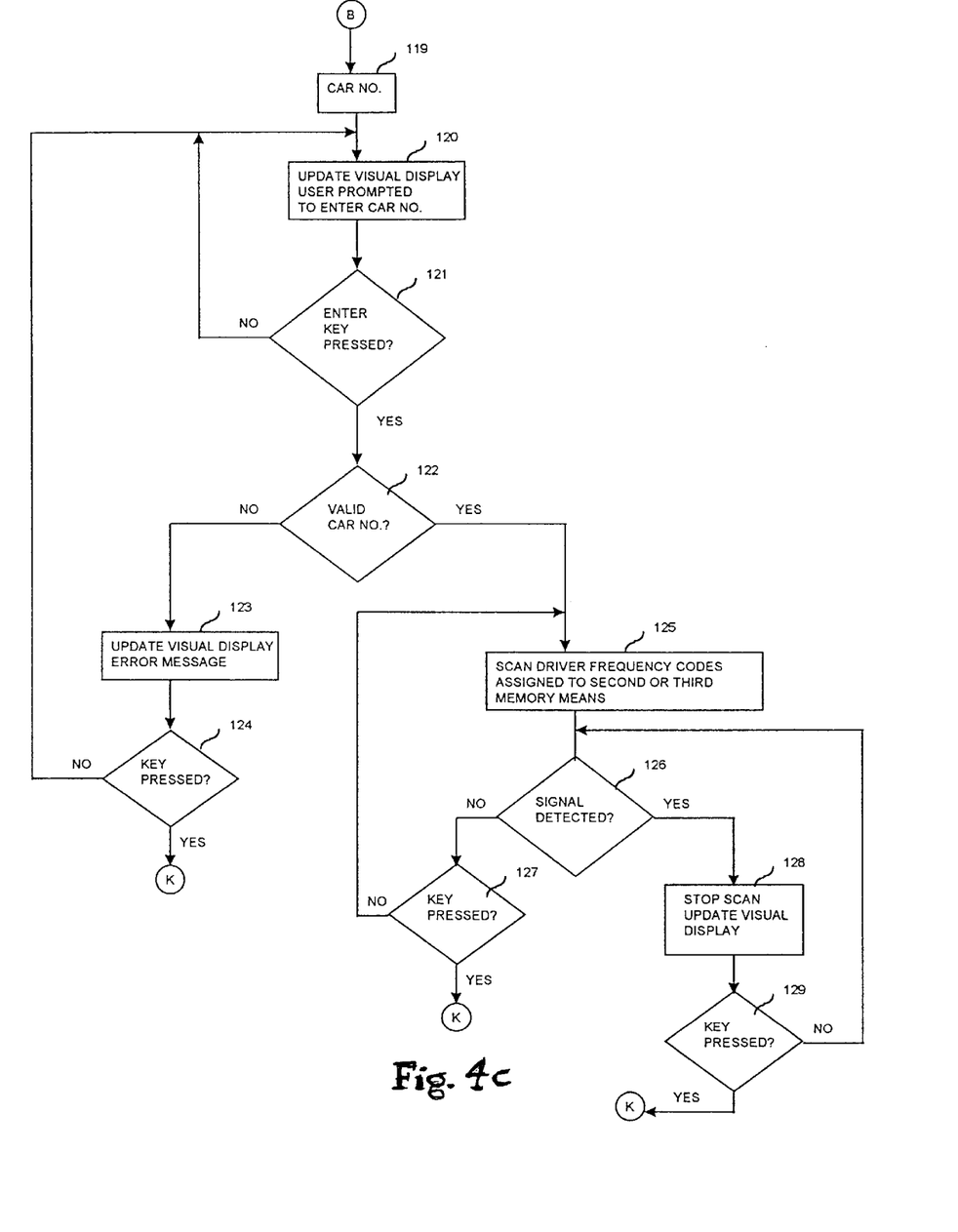
Figure 4D:
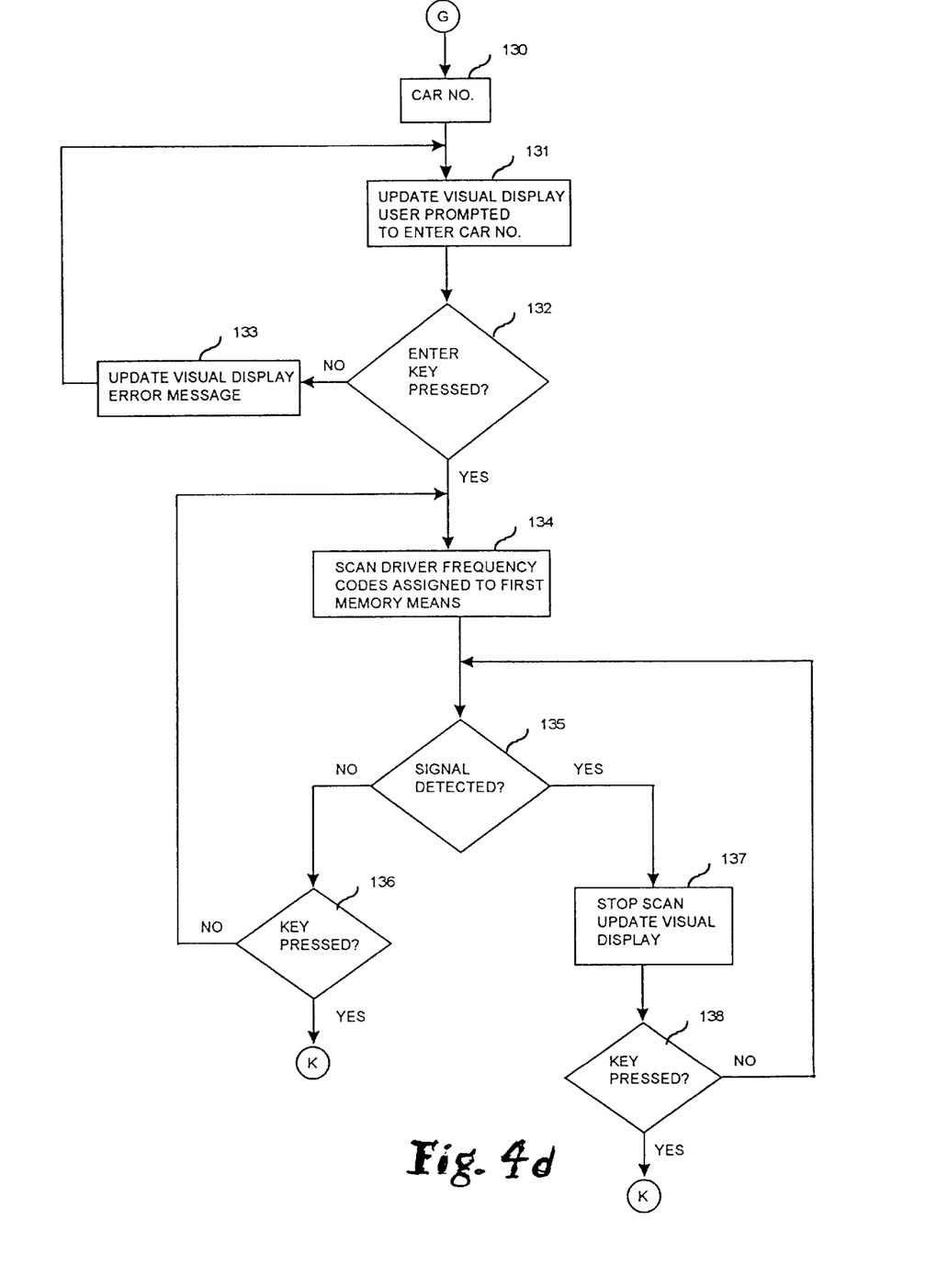
Figure 4E:
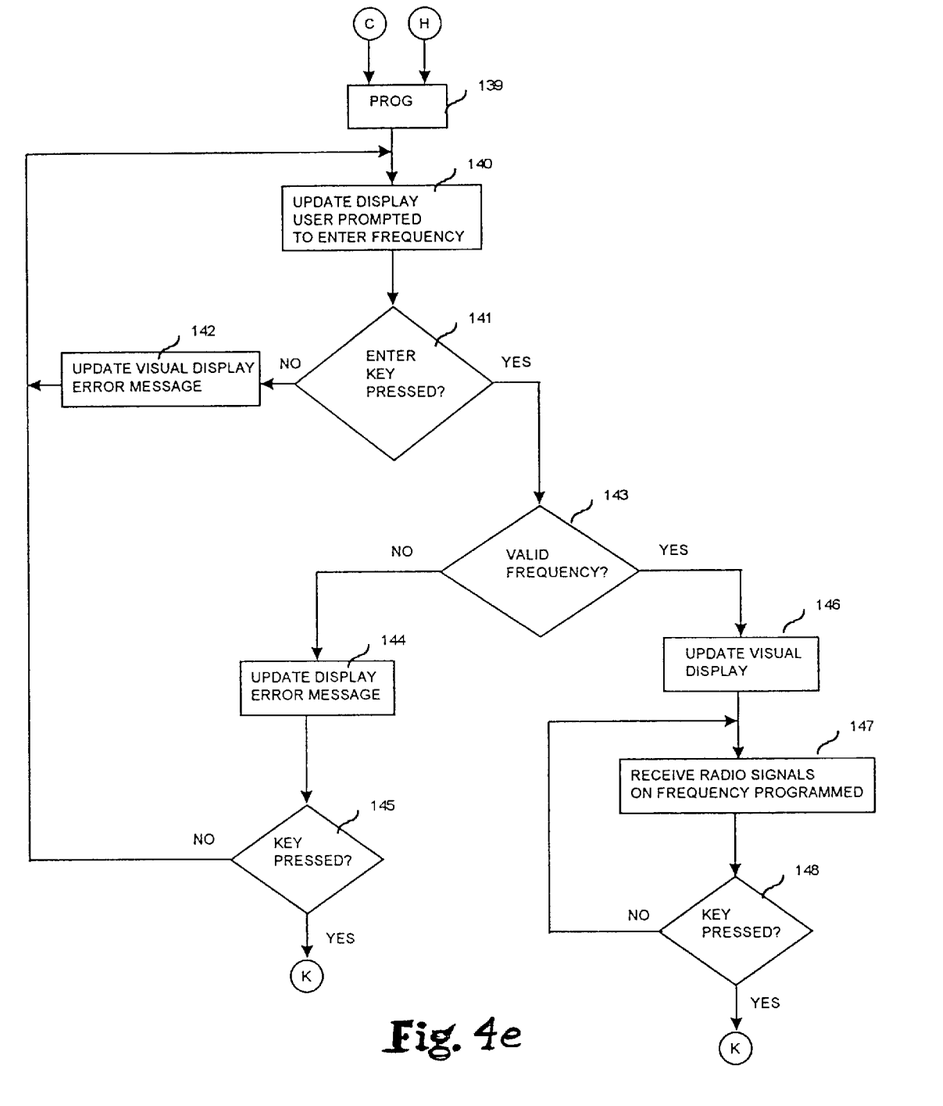
Figure 4F:
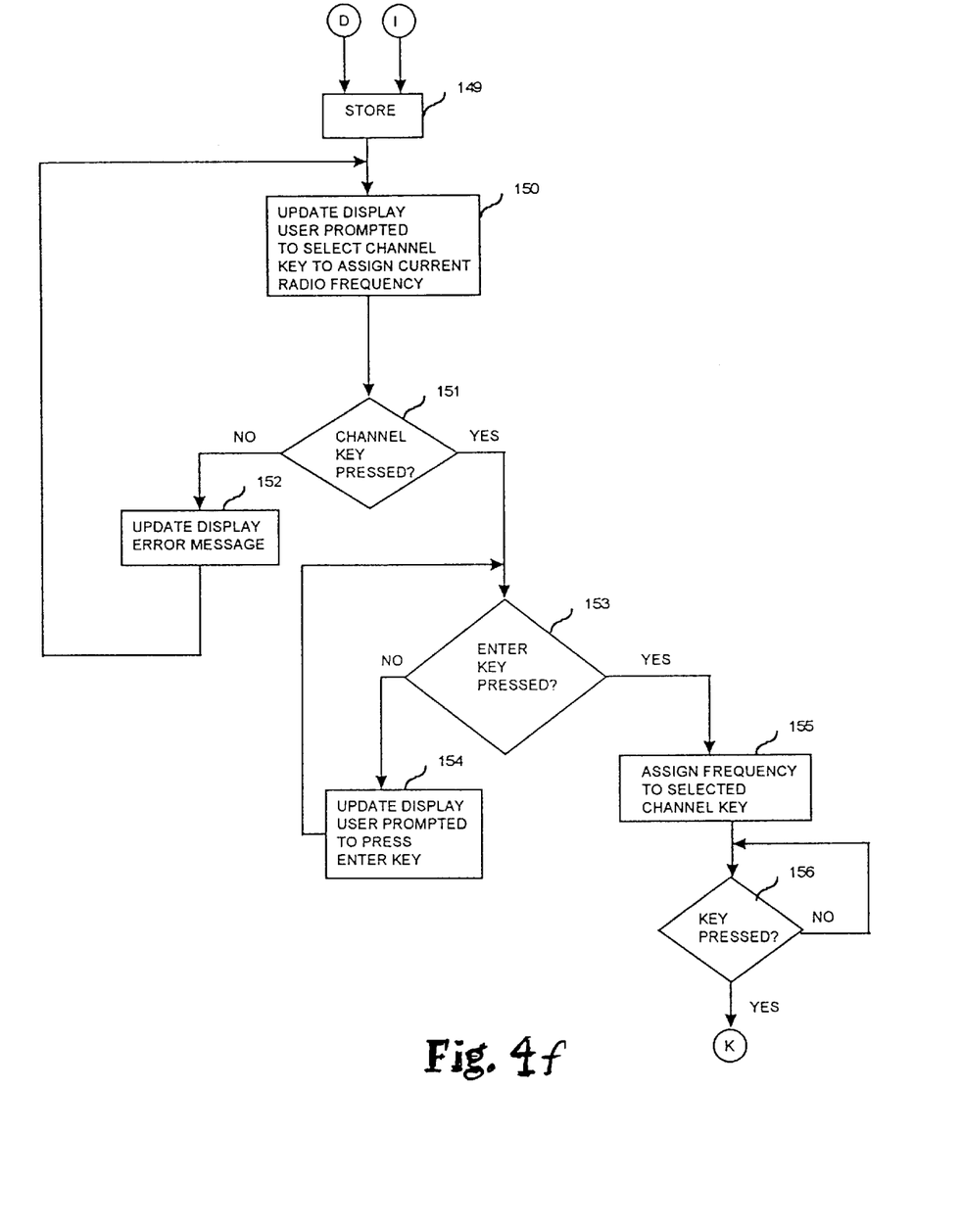
Figure 4G:
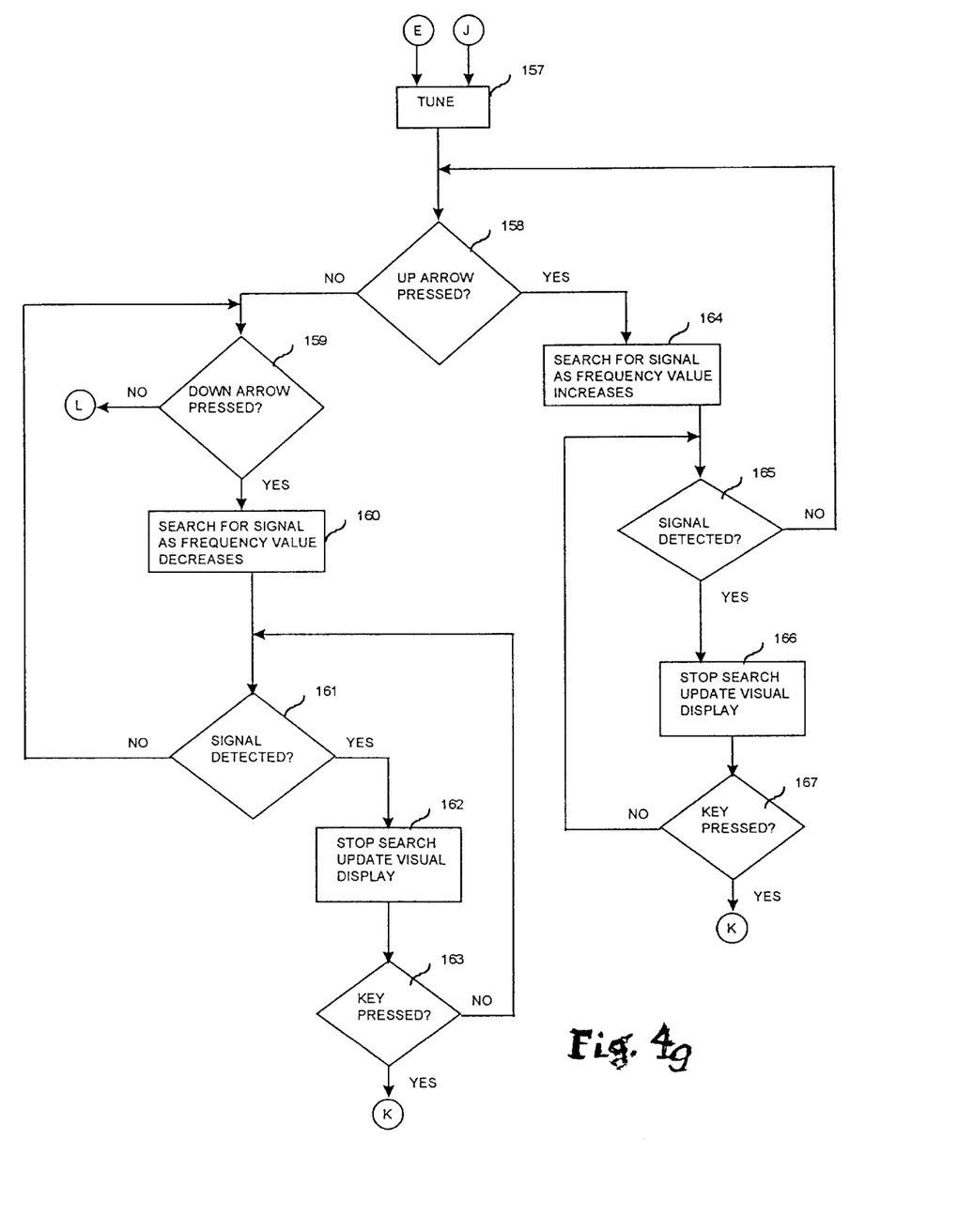
Figure 4H:
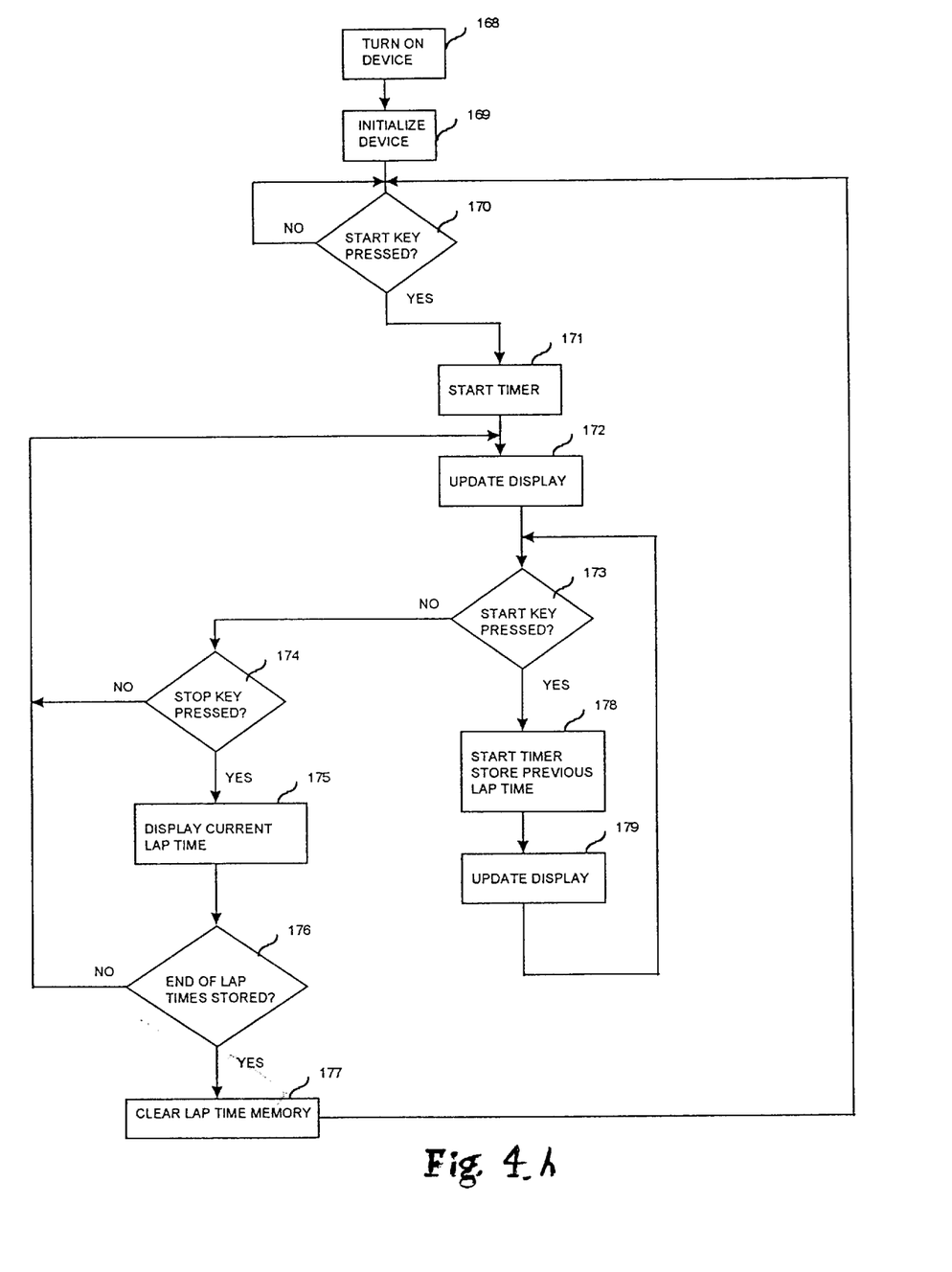

Referring particularly to FIG. 3, there is shown a block diagram of the electronic components of the radio monitor 10. The memory card 24 is shown in phantom and the first memory means 30 is additionally shown. The first memory means is in electrical communication with an onboard microprocessor 28. The first memory means 30 would only be in electrical communication with the microprocessor 28 when the memory card is inserted in the memory component slot 22 of the housing 12 (shown in FIG. 1). The first memory means 30 stores digital codes which are recognized by the microprocessor for loading and retrieving information and instruction and used to program the radio receiver for receiving signals on predetermined frequencies assigned to automobile racing teams. Again, the keypad overlay 20 which corresponds to the memory card identifies the functions and radio frequency channels assigned to the keypad 50 keys based upon the digital codes stored in the first memory means 30.

The removable and replaceable memory card 24 and related first memory means 30, allows the user to configure the radio receiver for listening to race teams of different racing divisions. Many of the keypad 50 keys are identified through the keypad overlay 20 by the race car number, typically the most popular race car drivers. In this regard, the user can listen to one of the drivers or driver teams by pressing the corresponding key with the number that matches the car number for the desired driver. The microprocessor 28 is responsive to the channel keys 52 of the keypad 50 and loads the frequency synthesizer 34 with digital codes read from the first memory means 30 or third memory means 58 in the absence of the first memory means 30. The frequency synthesizer 34 then operates to affect the RF amplifier and mixer circuitry 32 to receive the radio frequency signal from the antenna 33. Once the radio frequency is amplified by the RF amplifier 32, and modified to an IF frequency, signals are received by the IF amplifier and FM detector 38. The RF amplifier mixer circuitry 32 includes multiple bands. The local oscillator signal for the receiver is generated by the frequency synthesizer 34 which also supplies tracking signals to the RF amplifiers and performs band switching as required. Multiple-band RF amplifier and mixer circuitry of the present invention is well know in the art and does not require a detailed description.

The microprocessor 28 supplies data to the frequency synthesizer 34 from the first memory means 30 or the third memory means 58 in the absence of the first memory means 30 and receives clock input from the clock 36. When in scanning mode, the microprocessor 28 controls frequency scanning according to programs stored in the second memory means 56. A signal detector 40 communicates the presence of the radio frequency to the microprocessor 28 in the scanning and searching mode to determine its next operation according to the internal program. A demodulated signal is forwarded to the audio amplifier 42 which provides audible signals for the user to hear. When a particular frequency is selected, corresponding information can appear upon the electronic display 46 which receives signals from the microprocessor 28. The information may include the particular radio frequency, the name of the driver or other pertinent information.

The keypad 50 additionally includes function keys 54 which are utilized for executing algorithms and operations performed by the microprocessor 28. The microprocessor 28 is responsive to the function keys 54 for manually entering frequency information which may be stored in the third memory means 58. Additionally, command or other program executions may be carried out through the function keys 54 which are recognized by the microprocessor 28 from digital codes stored in the second memory means 56. In this regard, the function keys may initiate from the second memory means 56 frequency search algorithms, scanning operations of automobile racing team frequencies, monitoring of T.V. and radio broadcast frequencies and all frequencies within the receiving capability of the configurable radio monitor 10. The stop watch 48 may additionally be operated through the function keys 54 in which is executed by the microprocessor 28. The stop watch information may appear upon the display 46.

Referring particularly to FIG. 2, the keypad overlay 20 is shown. The keypad overlay 20 is a representative rendering of an example of a keypad overlay 20. It should be noted that the keypad overlays will vary depending upon the information stored within the first memory means 30. The touch and listen indicia item 60 are adapted to correspond to the channel keys 52 of the keypad 50. The indicia of a touch and listen component 60 label channel keys that are identified with car numbers belonging to popular drivers. In this manner, the user can depress on one of the touch and listen indicia 60, thereby depressing a channel key 52, and the user can then listen to the driver and driver's team radio communication. If a particular driver has more than one predetermined frequency assigned to the team, the receiver, if so programmed, may scan all frequencies assigned to that team when the associated car number channel key 52 is pressed. Scanning will continue until a radio transmission is detected or another channel key 52 or function key 54 is depressed. Other touch and listen keys may include channels that are used to assign frequencies that are determined by the user and programmed into the monitor 10. The T.V. radio indicia can be depressed for the user to monitor T.V. broadcasts and radio broadcasts at the race track. The track designation 64 may be pressed to scan track control radio transmissions and the officials 66 indicia may be pressed for the user to listen to the officials of the particular automobile racing sanctioning body.

Function keys 54 are located at the top of the keypad overlay 20 and along the left hand side of the overlay 20. The start function 68 starts a stop watch timer. A repeat press of the start function 68 records the succeeding lap time. The stop function 70 stops the stop watch timer. The stop function 70 may be also used to scroll through multi-lap times and to clear the stop watch.

The driver scan function 72 operates the radio receiver scanning program for all predetermined driver frequencies stored on the memory card 24 in the first memory means 30 or the third memory means 58 in the absence of the first memory means 30. The car number function 74 allows the radio receiver to receive radio transmissions from car numbers not assigned to the preassigned touch and listen key 60. When the car number 74 function is initiated, the touch and listen keys operate as numeric keys and they include number labels 0–9 and can be used to program the monitor 10. This allows the user to enter the car number of any car identified on the track and the receiver will scan the frequency or frequencies assigned to the car number entered.

The program function 76 permits the user to manually enter a desired radio frequency using the numeric keypad of the touch and listen key 60. The enter function 78 is used along with the car number 74 function and the program function 76 for entering data.

The store function 80 allows frequencies to be stored to channel keys 52 which are identified on the touch and listen function 60. The tune function 82 allows the user to manually search frequency bands for which the radio was designed by either using up or down frequency bands according to whether an up arrow or down arrow is pressed.

FIGS. 4a–4h show a flow chart of operations controlled by the microprocessor 28. It should be noted that the flow chart of FIGS. 4a–4h, presented for the application of the device for automobile racing, has been kept relatively simple in order to describe the basic operations carried out by the microprocessor 28. It is possible, of course, for the device to be applied to other sporting events or for personal scanning of radio broadcasts in the users immediate area, with appropriate configuration of the device, an array of channel keys and function keys, being contained on the interchangeable keypad overlay 20 and memory card 24 as described previously.

Referring to FIGS. 4a–4h, the configurable radio monitor transfers from block 90 to the initialized state block 91 upon turning on the device. The microprocessor 28 then transfers to block 92 where it remains until a user presses the key. Upon detecting a key pressed, the microprocessor 28 transfers to block 93 and determines the configuration of the radio monitor 10. If a memory card 24 is installed, the microprocessor 28 transfers to block 100 otherwise the microprocessor 28 is at block 94. At block 94 or block 100 the type of key pressed is determined. If a channel key 52 is pressed, the microprocessor 28 transfers to block 96 or block 102 if a memory card 24 is installed. If a function key 54 is pressed, the microprocessor 28 transfers to block 95 or block 101 if a memory card 24 is installed.

At block 96, the microprocessor 28 executes a scan algorithm which uses the second memory means 56 and third memory means 58. Execution of the algorithm includes blocks 97–100. Scanning stops when a signal is detected at block 97 or a key is pressed by the user. If a signal is detected, the visual display information is updated on the display means 46 at block 99 and then execution of the algorithm resumes. If a key is pressed, the program returns to block 93 where the process for determining the radio monitor 10 configuration and the type of key pressed is repeated.

At block 102, the microprocessor 28 executes a scan algorithm which uses the first memory means 30. Execution of the algorithm includes blocks 103–106. Scanning stops when a signal is detected at block 103 or a key is pressed by the user. If a signal is detected, the visual display information is updated on the display means 46 at block 105 and then execution of the algorithm resumes. If a key is pressed, the program returns to block 93 where the process for determining the radio monitor 10 configuration and the type of key pressed is repeated.

In block 95, the microprocessor will execute one of five algorithms based on which function key 54 is pressed. Algorithms executed from block 95 may use the second memory means 56 or the third memory means 58. The five algorithms are as follows:

Driver Scan, function key 72, blocks 107–112;
Car No., function key 74, blocks 119–129;
Prog., function key 76, blocks 139–148;
Enter, function key 78, block 141, or block 153; and
Store, function key 80, blocks 149–156.

In block 101, the microprocessor will execute one of five algorithms based on which function key 54 is pressed. Algorithms executed from block 101 may use the first memory means 30, second memory means 56 or third memory means 58. The five algorithms are as follows:

Drive Scan, function key 72, blocks 113–118;
Car No., function key 74, blocks 130–138;
Prog., function key 76, blocks 139–148;
Enter, function key 78, block 141 or block 153; and
Store, function key 80, blocks 149–156.

The stopwatch routine described in blocks 168 to 179 execute independently of the routines described in blocks 90 to 167. Therefore, the stopwatch routine may be executed concurrently with the routines of blocks 90 to 167. Pressing the Start function key 68 transfers the microprocessor 28 to block 171 and a timer begins counting while a previous lap time, if generated, is stored in the third memory means 30. Pressing the Stop function key 70 transfers the microprocessor 28 to block 175 and a timer stops counting while the current lap time is presented on the display 46. Repeated pressing of the Stop function key 70 displays a previously stored lap time until all stored lap times have been presented on the display 46. After the final lap time has been displayed, the next time the Stop function key 70 is pressed the lap time memory portion of the third memory means 58 is cleared.

Additional modifications and improvements of the present invention may also be apparent to those skilled in the art. Thus, a particular combination of parts described and illustrated herein is intended to represent only certain embodiments of the present invention and is not intended to serve as limitations of alternate devices within the spirit and scope of the invention.

What is claimed is:

1. A configurable hand held radio monitor for use in monitoring sporting events comprising:

a housing including a keypad opening; an electronic display opening; a keypad overlay slot adapted to frictionally receive a keypad overlay; and at least one memory component slot adapted to receive a modular memory card;

an onboard microprocessor for controlling the operations of the radio monitor;

at least one modular memory card including a first memory means for storing digital codes for predetermined frequencies, said memory means in electrical communication with said microprocessor when the modular memory card is inserted into the memory component slot of the housing;

a radio receiving circuit in electrical communication with the microprocessor, said radio receiving circuit receives an RF signal at a frequency determined by the microprocessor;

an audio output in electrical communication with said radio receiving circuit;

an electronic display in communication with said microprocessor and where said electrical display is visible through the transparent window of the housing;

a keypad comprising a plurality of keys in electrical communication with said microprocessor for manually entering commands to the microprocessor for execution and operation of the configurable radio monitor; and a changeable keypad overlay insertable into the keypad overlay slot of the housing having indicia formed to correspond to the plurality of keys of the keypad, and wherein said indicia identify the function of the key which corresponds to the codes stored in the first memory means.

2. The configurable hand held radio monitor of claim 1 further comprising a second memory means in communication with the microprocessor for storing additional digital codes for predetermined frequencies and instruction codes for use by the microprocessor.

3. The configurable hand held radio monitor of claim 2 wherein said keypad includes channel keys for selecting predetermined frequencies corresponding to digital codes stored within the first or second memory means, and function keys for issuing commands to the microprocessor which correspond to instruction codes stored within the second memory means.

4. The configurable hand held radio monitor of claim 2 further comprising a third memory means for storing digital codes corresponding to radio frequencies and other data input manually.

5. The configurable hand held radio monitor of claim 4 wherein said keypad includes channel keys for selecting predetermined frequencies corresponding to digital codes stored within the first, second or third memory means and function keys for issuing commands to the microprocessor which correspond to instruction codes stored within the second memory means.

6. The configurable hand held radio monitor of claim 5 wherein said channel keys will scan a plural of predetermined frequencies when a channel key is manually depressed.

7. The configurable hand held radio monitor of claim 1 further comprising a stopwatch circuit in communication with said microprocessor operable through the microprocessor from said keypad.

* * * * *